United States Patent
Chandrasekharan

(10) Patent No.: US 10,924,323 B1
(45) Date of Patent: Feb. 16, 2021

(54) APPARATUS, SYSTEM, AND METHOD FOR ENABLING NETWORK MANAGEMENT SYSTEMS TO QUERY AND OBTAIN RELATED OBJECTS STORED ON NETWORK DEVICES

(71) Applicant: Juniper Networks, Inc., Sunnyvale, CA (US)

(72) Inventor: Bijoymon M. Chandrasekharan, Bangalore (IN)

(73) Assignee: Juniper Networks, Inc, Sunnyvale, CA (US)

( * ) Notice: Subject to any disclaimer, the term of this patent is extended or adjusted under 35 U.S.C. 154(b) by 261 days.

(21) Appl. No.: 15/482,071

(22) Filed: Apr. 7, 2017

(51) Int. Cl.
*G06F 15/173* (2006.01)
*H04L 12/24* (2006.01)
*G06F 16/22* (2019.01)
*G06F 16/903* (2019.01)

(52) U.S. Cl.
CPC ...... *H04L 41/0213* (2013.01); *G06F 16/2246* (2019.01); *G06F 16/90335* (2019.01); *H04L 41/046* (2013.01)

(58) Field of Classification Search
CPC ............ H04L 41/0213; H04L 41/046; G06F 16/90335; G06F 16/2246
See application file for complete search history.

(56) References Cited

U.S. PATENT DOCUMENTS

| | | | | |
|---|---|---|---|---|
| 5,448,727 A | * | 9/1995 | Annevelink | G06F 16/284 |
| 6,549,943 B1 | * | 4/2003 | Spring | H04L 41/0213 709/201 |
| 7,054,926 B1 | * | 5/2006 | Abidi | H04L 41/0213 709/217 |
| 2006/0092861 A1 | * | 5/2006 | Corday | H04L 41/0246 370/256 |
| 2012/0030327 A1 | * | 2/2012 | Conrad | H04L 41/0213 709/223 |

* cited by examiner

*Primary Examiner* — Suraj M Joshi
*Assistant Examiner* — Jaren Means
(74) *Attorney, Agent, or Firm* — FisherBroyles, LLP

(57) ABSTRACT

The disclosed computer-implemented method may include (1) creating, at a network device, a relationship management information base that facilitates querying relationships of objects stored in at least one other management information base on the network device, (2) loading, into the relationship management information base, a partition that defines at least one relationship between a plurality of objects stored in the other management information base on the network device, (3) receiving, at the network device, a query directed to the relationship management information base from a network management system, and then in response to the query directed to the relationship management information base (4) obtaining the objects whose relationship is defined by the partition from the other management information base and (5) providing the objects obtained from the other management information base to the network management system to satisfy the query. Various other apparatuses, systems, and methods are also disclosed.

9 Claims, 7 Drawing Sheets

| Partition Configuration Table 500 | | | |
|---|---|---|---|
| PARTITION NAME | OID | OID REGULAR EXPRESSION | ROW STATUS |
| Partition 120(1) | ifDescr | <regex-1> to match ifIndex 20-30 | 1 |
| Partition 120(1) | tunnelIfLocalAddress | <regex-1> to match ifIndex 20-30 | 1 |
| Partition 120(1) | tunnelIfRemoteAddress | <regex-1> to match ifIndex 20-30 | 1 |
| Partition 120(N) | ifDescr | <regex-2> to match ifIndex 10-20 | 1 |
| Partition 120(N) | jnxOtnCurrentOdu15minBIP | <regex-2> to match ifIndex 10-20 | 1 |
| Partition 120(N) | jnxOtnCurrentOdu15minBBE | <regex-2> to match ifIndex 10-20 | 1 |

*FIG. 5*

| Partition OID Table 600 | | |
|---|---|---|
| PARTITION NAME | OID INSTANCE | OID VALUE |
| Partition 120(1) | ifDescr.20 | ge-0/0/1 |
| Partition 120(1) | ifDescr.21 | ge-0/0/2 |
| Partition 120(1) | tunnelIfLocalAddress.20 | 10.1.1.1 |
| Partition 120(1) | tunnelIfLocalAddress.21 | 10.2.2.2 |
| Partition 120(1) | tunnelIfRemoteAddress.20 | 10.1.1.2 |
| Partition 120(1) | tunnelIfRemoteAddress.21 | 10.1.1.3 |
| Partition 120(N) | ifDescr.10 | et-0/0/1 |
| Partition 120(N) | ifDescr.11 | et-0/0/2 |
| Partition 120(N) | jnxOtnCurrentOdu15minBIP.10 | 1200 |
| Partition 120(N) | jnxOtnCurrentOdu15minBIP.11 | 600 |
| Partition 120(N) | jnxOtnCurrentOdu15minBBE.10 | 2500 |
| Partition 120(N) | jnxOtnCurrentOdu15minBBE.11 | 400 |

*FIG. 6*

APPARATUS, SYSTEM, AND METHOD FOR ENABLING NETWORK MANAGEMENT SYSTEMS TO QUERY AND OBTAIN RELATED OBJECTS STORED ON NETWORK DEVICES

BACKGROUND

Network devices often maintain objects within Management Information Bases (MIBs). Many of these objects may be related in one way or another—even across various MIBs. For example, a network device may include a first MIB and a second MIB. In this example, one object stored in the first MIB may represent a virtual bridge, and other objects stored in the second MIB may represent statistics for certain interfaces that belong to the virtual bridge.

Unfortunately, the network device may fail to provide any mechanism that facilitates easy and/or convenient discovery of this relationship between the virtual bridge and the statistics for the interfaces belonging to the virtual bridge, especially due to the corresponding objects being stored in different MIBs. As a result, to discover such a relationship, a user may need to search various MIB definitions on the network device to manually identify the relationship between the objects stored in the different MIBs. To access and/or obtain the related objects, the user may then need to submit a single query and/or request that includes the Object IDentifiers (OIDs) for each of the related objects via a Network Management System (NMS) tool.

Unfortunately, many NMS tools may limit the number of OIDs that will fit in a single query and/or request, thereby making access to the grouping of related objects very cumbersome, if not impossible. The instant disclosure, therefore, identifies and addresses a need for improved apparatuses, systems, and methods for enabling NMSes to query and/or obtain related objects stored on network devices.

SUMMARY

As will be described in greater detail below, the instant disclosure generally relates to apparatuses, systems, and methods for enabling NMSes to query and/or obtain related objects stored on network devices. In one example, a computer-implemented method for enabling NMSes to query and/or obtain related objects stored on network devices may include (1) creating, at a network device, a relationship MIB that facilitates querying relationships of objects stored in at least one other MIB on the network device, (2) loading, into the relationship MIB, a partition that defines at least one relationship between a plurality of objects stored in the other MIB on the network device, (3) receiving, at the network device, a query directed to the relationship MIB from a network management system, and then in response to the query directed to the relationship MIB (4) obtaining the objects whose relationship is defined by the partition loaded into the relationship MIB from the other MIB and (5) providing the objects obtained from the other MIB to the network management system to satisfy the query.

As another example, a system for implementing the above-described method may include various modules stored in memory. The system may also include at least one physical processor that executes these modules. For example, the system may include (1) a creation module that creates a relationship MIB that facilitates querying relationships of objects stored in at least one other MIB on the network device, (2) a partition module that loads, into the relationship MIB, a partition that defines at least one relationship between a plurality of objects stored in the other MIB on the network device, (3) a receiving module that receives a query directed to the relationship MIB from a network management system, (4) an obtaining module that obtains the objects whose relationship is defined by the partition in response to the query, and (5) a providing module, stored in memory at the network device, that provides the objects obtained from the other MIB to the network management system to satisfy the query.

As a further example, an apparatus for implementing the above-described method may include (1) at least one storage device that stores a relationship MIB that facilitates querying relationships of objects stored in at least one other MIB on the network device, (2) at least one physical processing device that is communicatively coupled to the storage device at a network device, wherein the physical processing device (A) loads, into the relationship MIB, a partition that defines at least one relationship between a plurality of objects stored in the other MIB on the network device, (B) receives a query directed to the relationship MIB from a network management system, and then in response to the query directed to the relationship MIB (C) obtains the objects whose relationship is defined by the partition loaded into the relationship MIB from the other MIB and (D) provides the objects obtained from the other MIB to the network management system to satisfy the query.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is an illustration of exemplary partition configuration table included in a partition that defines relationships between objects stored in MIBs on a network device.

FIG. 6 is an illustration of exemplary partition OID table included in a partition that defines relationships between objects stored in MIBs on a network device.

Figure 1:
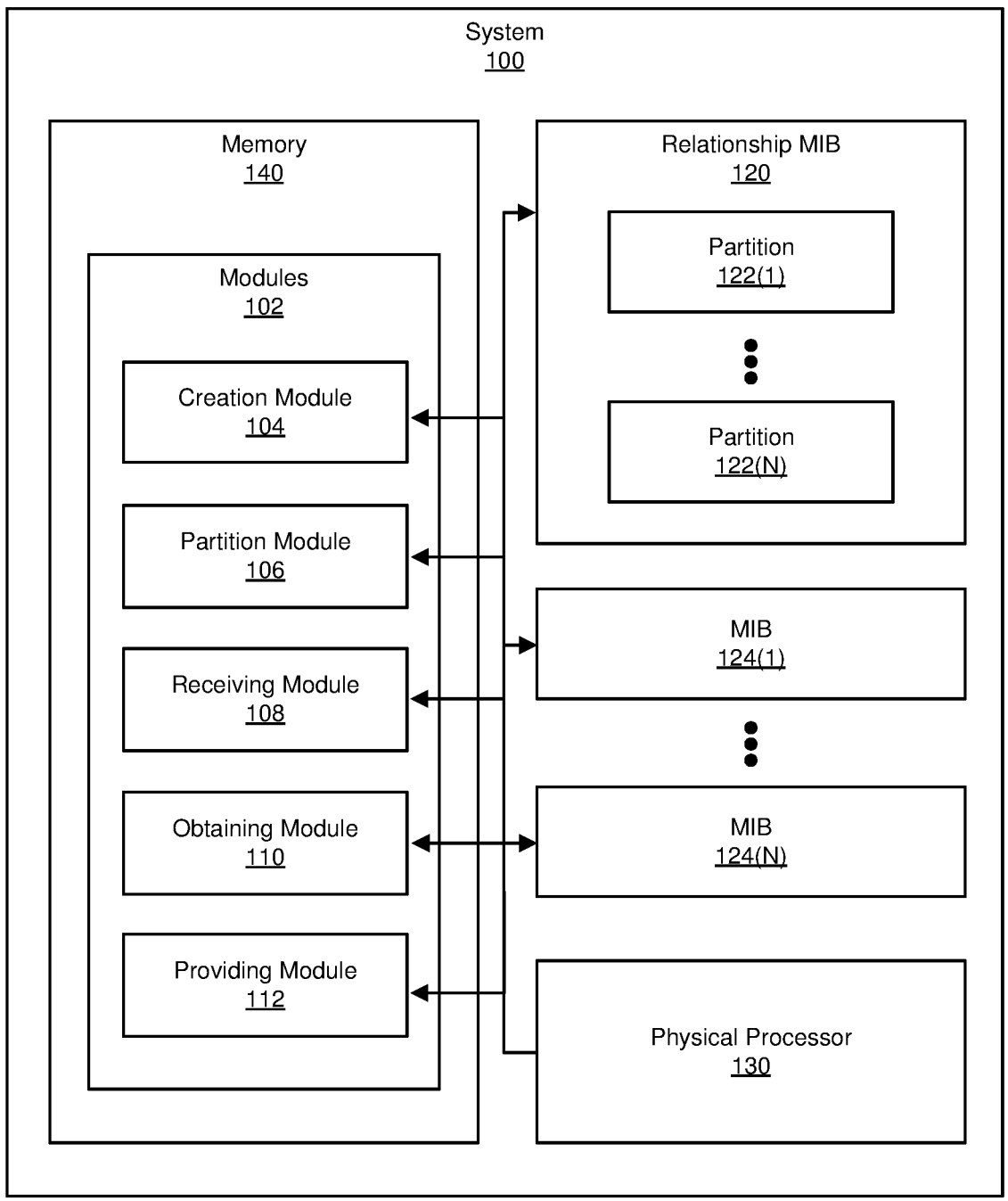
FIG. 1 is a block diagram of an exemplary system for enabling NMSes to query and/or obtain related objects stored on network devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for enabling NMSes to query and/or obtain related objects stored on network devices. As will be explained in greater detail below, the various apparatuses, systems, and methods described herein may provide a relationship MIB that facilitates querying relationships of objects stored in other MIBs on a network device. These apparatuses, systems, and methods may also load a partition into the relationship MIB. This partition may define relationships between objects stored in different MIBs on the network device. By loading this partition into the relationship MIB, these apparatuses, systems, and methods may enable an NMS to query the partition loaded into the relationship MIB to discover the relationship between these objects.

Moreover, by querying the partition loaded into the relationship MIB, the NMS may be able to easily and/or conveniently discover the relationship between these objects without necessitating a search of MIB definitions and/or a manual identification of the relationship by a user of the NMS. As a result, the NMS may be able to access and/or obtain the related objects—even though they span across multiple MIBs—without including the OIDs for each of the related objects in a single query and/or request.

Figure 2:
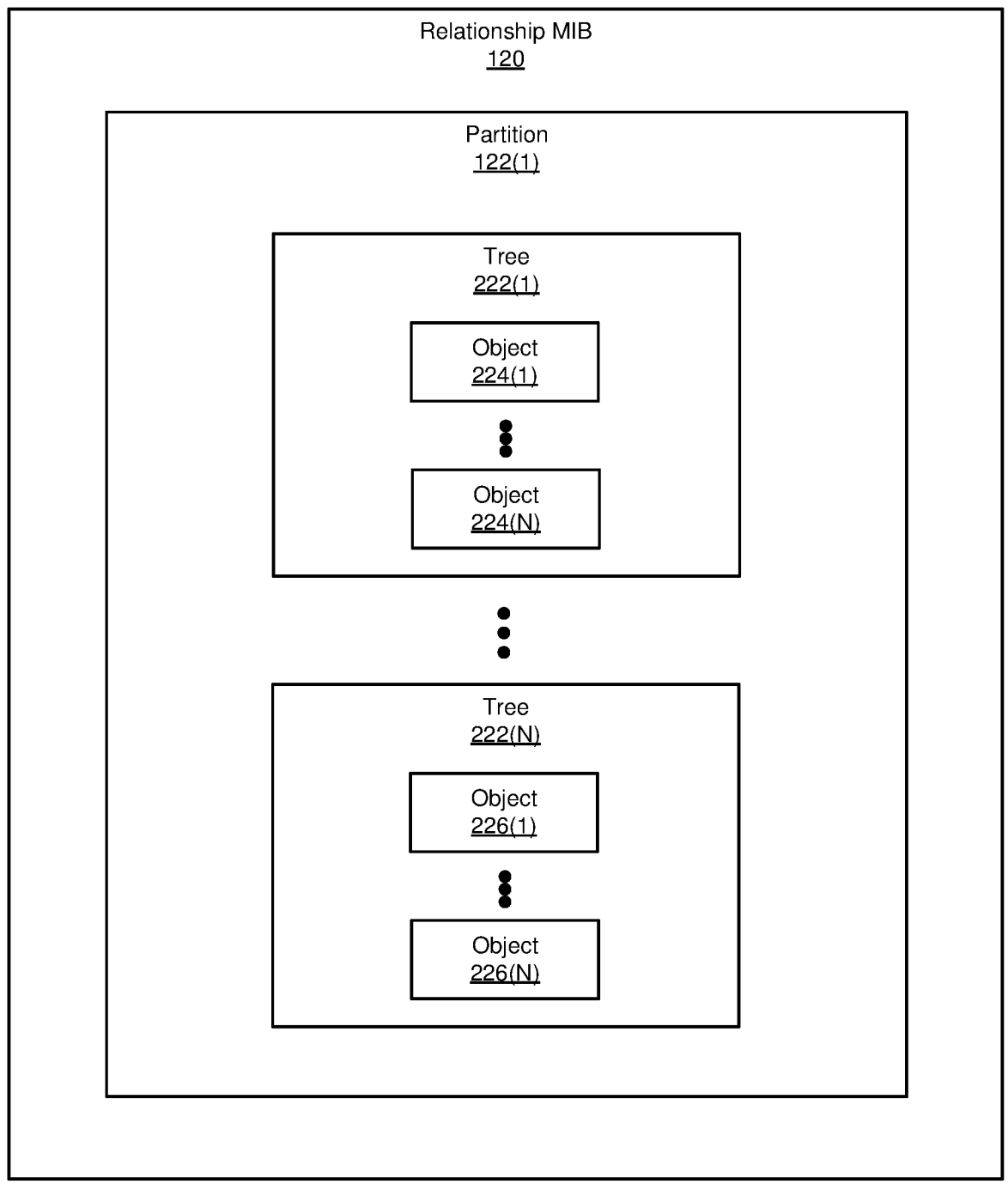
FIG. 2 is a block diagram of an additional exemplary system for enabling NMSes to query and/or obtain related objects stored on network devices.
Figure 3:
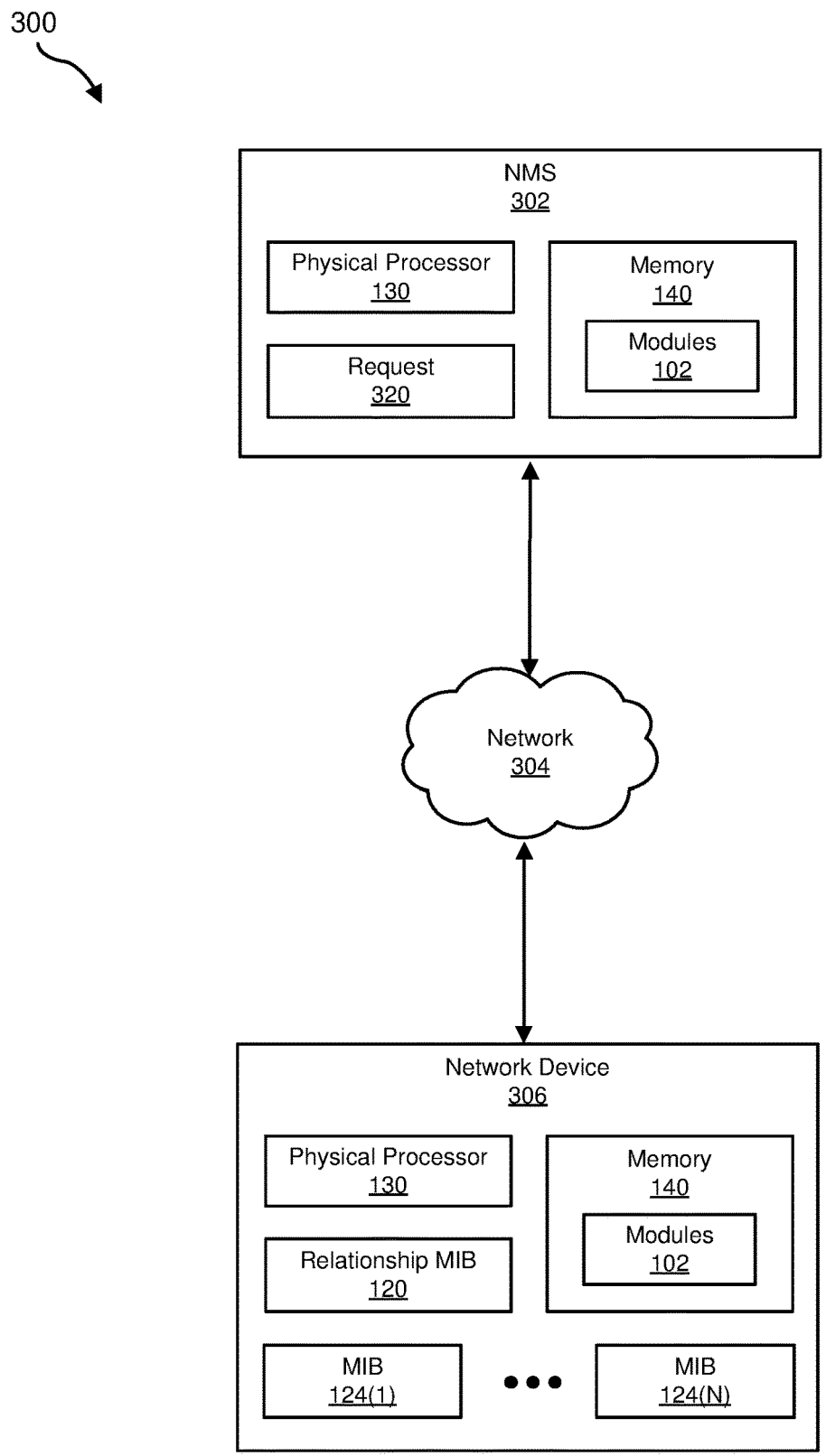
FIG. 3 is a block diagram of an exemplary relationship MIB on a network device.

The following will provide, with reference to FIGS. 1-3, detailed descriptions of exemplary systems for enabling NMSes to query and/or obtain related objects stored on network devices. Detailed descriptions of corresponding computer-implemented methods will be provided in connection with FIG. 4. Detailed descriptions of an exemplary partition configuration table and an exemplary partition OID table will be provided in connection with FIGS. 5 and 6. In addition, detailed descriptions of an exemplary computing system that facilitates implementing these methods will be provided in connection with FIG. 7.

FIG. 1 is a block diagram of an exemplary system 100 for enabling NMSes to query and/or obtain related objects stored on network devices. As illustrated in this figure, exemplary system 100 may include one or more modules 102 for performing one or more tasks. As will be explained in greater detail below, modules 102 may include a creation module 104, a partition module 106, a receiving module 108, an obtaining module 110, and a providing module 112. Although illustrated as separate elements, one or more of modules 102 in FIG. 1 may represent portions of a single module or application (such as an NMS tool, an SNMP tool, an SNMP agent, and/or an SNMP sub-agent).

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 3 (e.g., NMS 302 and/or network device 306). One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to enable NMSes to query and/or obtain related objects stored on network devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may also include one or more MIBs, such as relationship MIB 120 and/or MIBs 124(1)-(N). In some examples, relationship MIB 120 may facilitate querying relationships of objects stored in MIBs 124(1)-(N) on a network device. In these examples, relationship MIB 120 may include one or more partitions 122(1)-(N) that define relationships of certain objects stored in MIBs 124(1)-(N) on the network device. In one example, some of the objects whose relationships are defined by partitions 122(1)-(N) may be stored in different MIBs. In another example, other objects whose relationships are defined by partitions 122(1)-(N) may be stored in a single MIB.

In some examples, a user of an NMS may configure and/or create one or more of partitions 122(1)-(N) to define relationships between certain objects in which the user has a particular interest. In such examples, the NMS may direct the network device to load the partition into relationship MIB 120. After the network device has loaded the partition into relationship MIB 120, the user may be able to query the partition loaded into relationship MIB 120 for the relationships between those objects on the network device. By doing so, the user may be able to obtain all those related objects via the NMS by submitting a single query and/or request to the network device. This single query and/or request need not include the OIDs for each of the related objects. Instead, this single query and/or request may include and/or identify only the partition name assigned to the partition and/or the OID assigned to the partition.

FIG. 2 is a block diagram of exemplary relationship MIB 120. As illustrated in this figure, exemplary relationship MIB 120 may include partition 122(1). In this example, partition 122(1) may include objects 224(1)-(N) and 226(1)-(N). Partition 122(1) may maintain and/or organize objects 224(1)-(N) and 226(1)-(N) as tree data structures. For example, partition 122(1) may include trees 222(1)-(N). In this example, tree 222(1) may include objects 224(1)-(N), and tree 222(N) may include objects 226(1)-(N).

Exemplary system 100 in FIG. 1 may be implemented in a variety of ways. For example, all or a portion of exemplary system 100 may represent portions of exemplary system 300 in FIG. 3. As shown in FIG. 3, system 300 may include an NMS 302 and a network device 306 in communication with one another via a network 304. In one example, all or a portion of the functionality of modules 102 may be performed by NMS 302, network device 306, and/or any other suitable computing system. As will be described in greater detail below, one or more of modules 102 from FIG. 1 may, when executed by at least one processor of NMS 302 or network device 306, enable NMS 302 to query and/or obtain related objects stored on network device 306.

Network device 306 generally represents any type or form of physical computing device that facilitates communication within a network and/or across networks. In one example, network device 306 may include and/or represent a router (such as a customer edge router, a provider edge router, a hub router, a spoke router, an autonomous system boundary router, and/or an area border router). Additional examples of network device 306 include, without limitation, switches, hubs, modems, bridges, repeaters, gateways, multiplexers, network adapters, network interfaces, servers, portions of one or more of the same, combinations or variations of one or more of the same, exemplary computing system 700 in FIG. 7, and/or any other suitable network device.

NMS 302 generally represents any set of physical computing devices that facilitate managing and/or supervising certain components and/or devices within a network. In one example, NMS 302 may include and/or represent a group of multiple physical computing devices (even though FIG. 3 only illustrates NMS 302 as a single device). In another example, NMS 302 may include and/or represent a single physical computing device. In either example, NMS 302 may include certain software that facilitates managing and/or supervising network devices remotely. Examples of NMS 302 include, without limitation, servers, network devices, client devices, laptops, tablets, desktops, cellular phones, Personal Digital Assistants (PDAs), multimedia players, embedded systems, wearable devices (e.g., smart watches, smart glasses, etc.), gaming consoles, combinations or variations of one or more of the same, exemplary computing system 700 in FIG. 7, or any other suitable NMS.

Network 304 generally represents any medium or architecture capable of facilitating communication or data transfer. In one example, network 304 may facilitate communication between NMS 302 and network device 306. In this example, network 304 may facilitate communication or data transfer using wireless and/or wired connections. Examples of network 304 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), an MPLS network, portions of one or more of the same, variations or combinations of one or more of the same, and/or any other suitable network. Although illustrated as being external to network 304 in FIG. 3, NMS 302 and network device 306 may each represent a portion of network 304 and/or be included in network 304.

Figure 4:
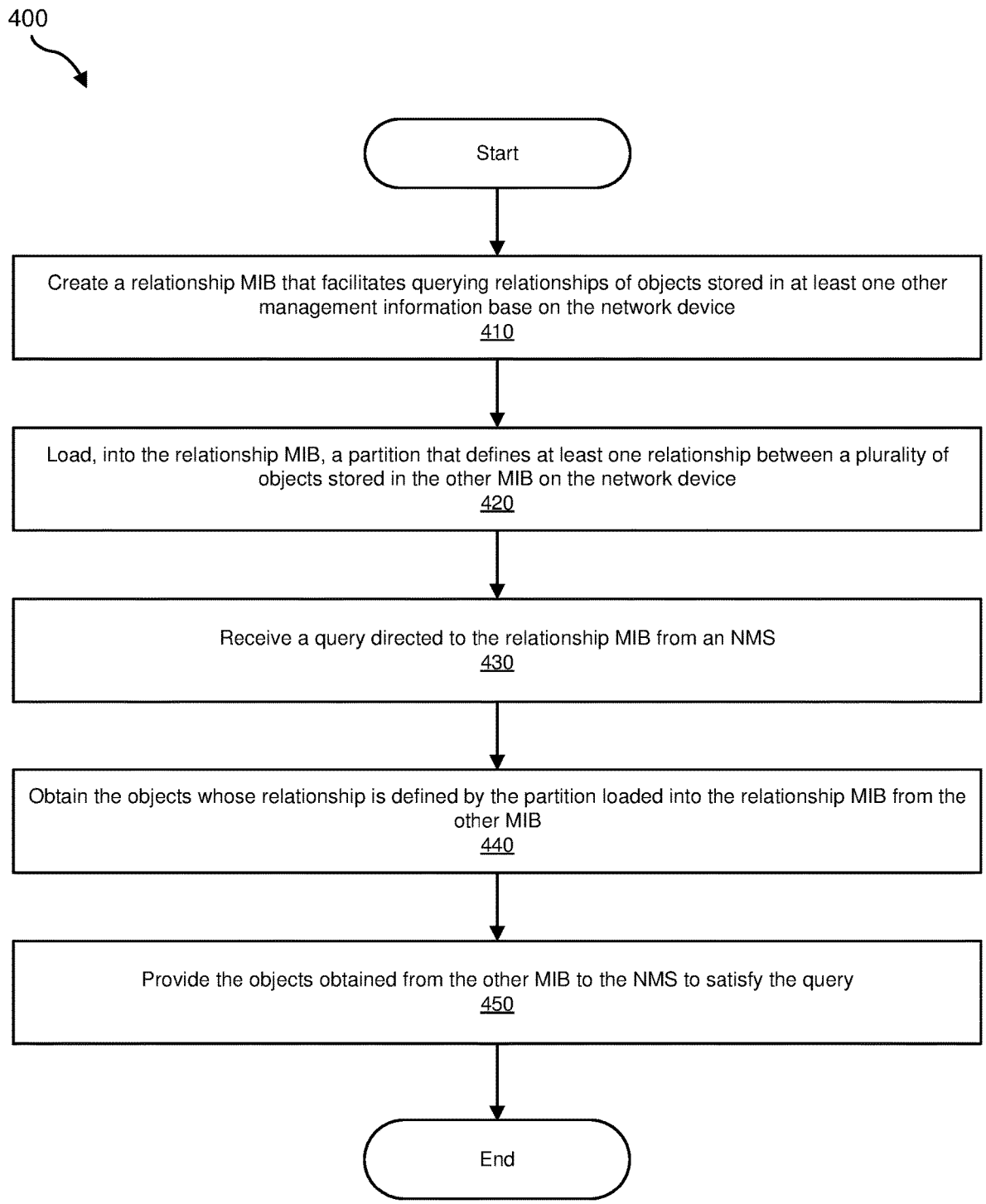
FIG. 4 is a flow diagram of an exemplary method for enabling NMSes to query and/or obtain related objects stored on network devices.

FIG. 4 is a flow diagram of an example computer-implemented method 400 for enabling NMSes to query and/or obtain related objects stored on network devices. The steps shown in FIG. 4 may be performed by any suitable computer-executable code and/or computing system, including system 100 in FIG. 1, system 200 in FIG. 2, system 700 in FIG. 7, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 410 one or more of the systems described herein may create a relationship MIB that facilitates querying relationships of objects stored in at least one other MIB on a network device. For example, creation module 104 may, as part of network device 306 in FIG. 3, create relationship MIB 120 that facilitates querying relationships of objects stored in MIBs 124(1)-(N) on network device 306. In this example, relationship MIB 120 may be configured and/or programmed to accept and/or store partitions that define such relationships.

The systems described herein may perform step 410 in a variety of different ways and/or contexts. In some examples, creation module 104 may allocate memory on network device 306 to servicing and/or maintaining relationship MIB 120. In such examples, creation module 104 may structure that memory as a database that is dedicated to storing partitions for defining relationships between objects belonging to other MIBs. In one example, relationship MIB 120 may be supported by and/or accessed via the Simple Network Management Protocol (SNMP).

Returning to FIG. 4, at step 420 one or more of the systems described herein may load, into the relationship MIB, a partition that defines at least one relationship between a plurality of objects stored in the other MIBs on the network device. For example, partition module 106 may, as part of network device 306 in FIG. 3, load partition 122(1) into relationship MIB 120. In this example, partition 122(1) may define certain relationships between objects 224(1)-(N) and/or 226(1)-(N) in FIG. 2.

Each of objects 224(1)-(N) and/or 226(1)-(N) may be stored and/or maintained in at least one of MIBs 124(1)-(N). Accordingly, objects 224(1)-(N) and/or 226(1)-(N) may span across multiple MIBs on network device 306. In some examples, each of objects 224(1)-(N) and/or 226(1)-(N) may include an OID and a value that corresponds to that OID.

The systems described herein may perform step 420 in a variety of different ways and/or contexts. In some examples, partition module 106 may store partition 122(1) in relationship MIB 120. In one example, partition module 106 may assign a partition name to partition 122(1). In this example, the partition name may be used to identify and/or reference partition 122(1) in connection with queries from NMS 302.

In one example, partition module 106 may populate partition 122(1) with one or more trees that include OIDs of objects stored in MIBs 124(1)-(N). For example, partition module 106 may organize partition 122(1) with trees 222 (1)-(N). In this example, tree 222(1) may include OIDs of objects 224(1)-(N) and/or identify objects 224(1)-(N). Additionally or alternatively, tree 222(N) may include OIDs of objects 226(1)-(N) and/or identify objects 226(1)-(N).

In one example, partition 122(1) may include and/or represent a set of relationship definitions created and/or configured by a user of NMS 302. In another example, partition 122(1) may include and/or represent a set of relationship definitions created and/or configured by a computing device (such as NMS 302).

In some examples, partition 122(1) may include certain tables. For example, partition 122(1) may include a table of trees 222(1)-(N). In other words, this table may include trees 222(1)-(N). In this example, partition module 106 may index the table by the partition name assigned to partition 122(1) and trees 222(1)-(N).

In one example, partition module 106 may push partition 122(1) into a configuration table (such as "queryPartitionConfigTable") of relationship MIB 120. In this example, the configuration table may define a set of OID subtrees and/or append an optional regular expression to the end of the OIDs.

As a specific example, partition 122(1) may include a partition configuration table 500 in FIG. 5. As illustrated in FIG. 5, partition configuration table 500 may include various columns (in this example, "PARTITION NAME", "OID", "OID REGULAR EXPRESSION", and "ROW STATUS"). Partition configuration table 500 may include various partition name entries (in this example, "Partition 120(1)" and "Partition 120(N)"), various OIDs (in this example, "ifDescr", "tunnelIfLocalAddress", "tunnelIfRemoteAddress", "jnxOtnCurrentOdu15minBIP", and "jnxOtnCurrentOdu15minBBE"), various OID regular expressions (in this example, "<regex-1> to match ifIndex 20-30" and "<regex-2> to match ifIndex 10-20"), and row statuses (in this example, "1"). Partition configuration table 500 may also include one or more other entries that are not necessarily illustrated and/or represented in FIG. 5.

As another example, partition 122(1) may include a partition OID table 600 in FIG. 6. As illustrated in FIG. 6, partition configuration table 600 may include various columns (in this example, "PARTITION NAME", "OID INSTANCE", and "OID VALUE"). Partition configuration table 600 may include various partition name entries (in this example, "Partition 120(1)" and "Partition 120(N)"), various OID instances (in this example, "ifDescr.20", "ifDescr.21", "tunnelIfLocalAddress.20", "tunnelIfLocalAddress.21", "tunnelIfRemoteAddress.20", "tunnelIfRemoteAddress.21", "ifDescr.10", "ifDescr.11", "jnxOtnCurrentOdu15minBIP.10", "jnxOtnCurrentOdu15minBIP.11", "jnxOtnCurrentOdu15minBBE.10", and "jnxOtnCurrentOdu15minBBE.11"), and various OID values (in this example, "ge-0/0/1", "ge-0/0/2", "10.1.1.1", "10.2.2.2", "10.1.1.2", "10.1.1.3", "et-0/0/1", "et-0/0/2", "1200", "600", "2500", and "400"). Partition OID table 600 may also include one or more other entries that are not necessarily illustrated and/or represented in FIG. 6.

In some examples, partition module 106 may load one or more other partitions (such as partition 122(N)) into relationship MIB 120. In this example, partition 122(N) may define certain relationships between other objects stored in MIBs 124(1)-(N). As a specific example, partition 122(N) may define the relationships between a virtual bridge, the main interface of the virtual bridge, the sub-interface(s) of the virtual bridge, and the statistics for those interfaces belonging to the virtual bridge.

Returning to FIG. 4, at step 430 one or more of the systems described herein may receive a query directed to the relationship MIB from an NMS. For example, receiving module 108 may, as part of network device 306 in FIG. 3, receive a query directed to relationship MIB 120 from NMS 302. In one example, the query may include, represent, and/or involve an SNMP request (such as request 320 in FIG. 3).

The systems described herein may perform step 430 in a variety of different ways and/or contexts. In some examples, receiving module 108 may monitor network device 306 for incoming queries. While monitoring network device 306 in this way, receiving module 108 may detect and/or receive an incoming query from NMS 302. For example, NMS 302 may send request 320 to network device 302 via network 304. As request 320 arrives at network device 302, receiving module 108 may receive request 320 from NMS 302.

In one example, request 320 may include and/or identify the partition name assigned to partition 122(1). Additionally or alternatively, request 320 may include and/or identify an OID assigned to partition 122(1). In some examples, request 320 may have been initiated, created, and/or sent by a user operating NMS 302.

Returning to FIG. 4, at step 440 one or more of the systems described herein may obtain the objects whose relationship is defined by the partition loaded into the relationship MIB from the other MIB. For example, obtaining module 110 may, as part of network device 302 in FIG. 3, obtain related objects 224(1)-(N) and/or 226(1)-(N) from one or more of MIBs 124(1)-(N). In this example, obtaining module 110 may initiate obtaining these objects in response to the SNMP query received from NMS 306. The relationships among objects 224(1)-(N) and/or 226(1)-(N) may be defined and/or set forth by partition 122(1).

The systems described herein may perform step 440 in a variety of different ways and/or contexts. In some examples, obtaining module 110 may discover the relationships among objects 224(1)-(N) and/or 226(1)-(N) by accessing and/or analyzing partition 122(1) based at least in part on the query. For example, obtaining module 110 may send the SNMP query to the partition OID table (such as "queryPartitionOIDTable") of relationship MIB 120 based at least in part on the partition name identified in the SNMP query. In this example, obtaining module 110 may obtain all the OID instances and/or the corresponding values from this partition OID table.

In one example, partition module 106 and/or obtaining module 110 may include and/or represent an SNMP agent. In this example, the SNMP agent may obtain instances of objects 224(1)-(N) and/or 226(1)-(N) from one or more of MIBs 124(1)-(N). For example, the SNMP agent may query a sub-agent that manages the corresponding MIB(s) for instances of those objects. The sub-agent may then provide instances of those objects to the SNMP agent. In turn, the SNMP agent may populate partition 122(1) with those objects to facilitate satisfying any future queries. Additionally or alternatively, the SNMP agent may gather those objects to send back to NMS 302 in response to an existing query.

Returning to FIG. 4, at step 450 one or more of the systems described herein may provide the objects obtained from the other MIB to the NMS to satisfy the query. For example, providing module 112 may, as part of network device 306 in FIG. 3, provide objects 224(1)-(N) and/or 226(1)-(N) to NMS 302 to satisfy the query from NMS 302. In this example, the objects may include and/or represent the OIDs and/or the values corresponding to the OIDs.

The systems described herein may perform step 450 in a variety of different ways and/or contexts. In some examples, providing module 112 may send a reply to NMS 302 via network 304. This reply may include instances of objects 224(1)-(N) and/or 226(1)-(N) even though those objects span across multiple MIBs on network device 306. By sending this reply to NMS 302, providing module 112 may satisfy the query received from NMS 302.

In some examples, partition module 106 and/or obtaining module 110 may configure each of objects 224(1)-(N) and/or 226(1)-(N) as a generic data type. For example, partition module 106 and/or obtaining module 110 may configure objects 224(1)-(N) and/or 226(1)-(N) as opaque data types such that those objects are effectively encoded prior to transfer to NMS 302. Accordingly, those objects may be transferred as opaque data types in the reply. In other words, providing module 112 may direct network device 306 to transfer those objects as opaque data types to NMS 302. Upon receiving objects 224(1)-(N) and/or 226(1)-(N) from network device 306, NMS 302 may decode those objects from the opaque data types and then use the decoded objects.

In some examples, the various apparatuses, systems, and methods described herein may enable users of NMSes to simultaneously query any collection of objects that meet certain conditions via a single request. Such objects may include any (1) whose relationships are defined by a partition loaded into a relationship MIB on a network device and (2) that are represented in an SNMP view provided to those users. In other words, rather than restricting users from querying a particular set of OIDs, these apparatuses, systems, and methods may enable users to query all objects belonging to a partition that includes OIDs accessible to the users in their SNMP view. Accordingly, these apparatuses, systems, and methods may enable a user to query all the OID subtrees within a partition in a single walk.

Figure 7:
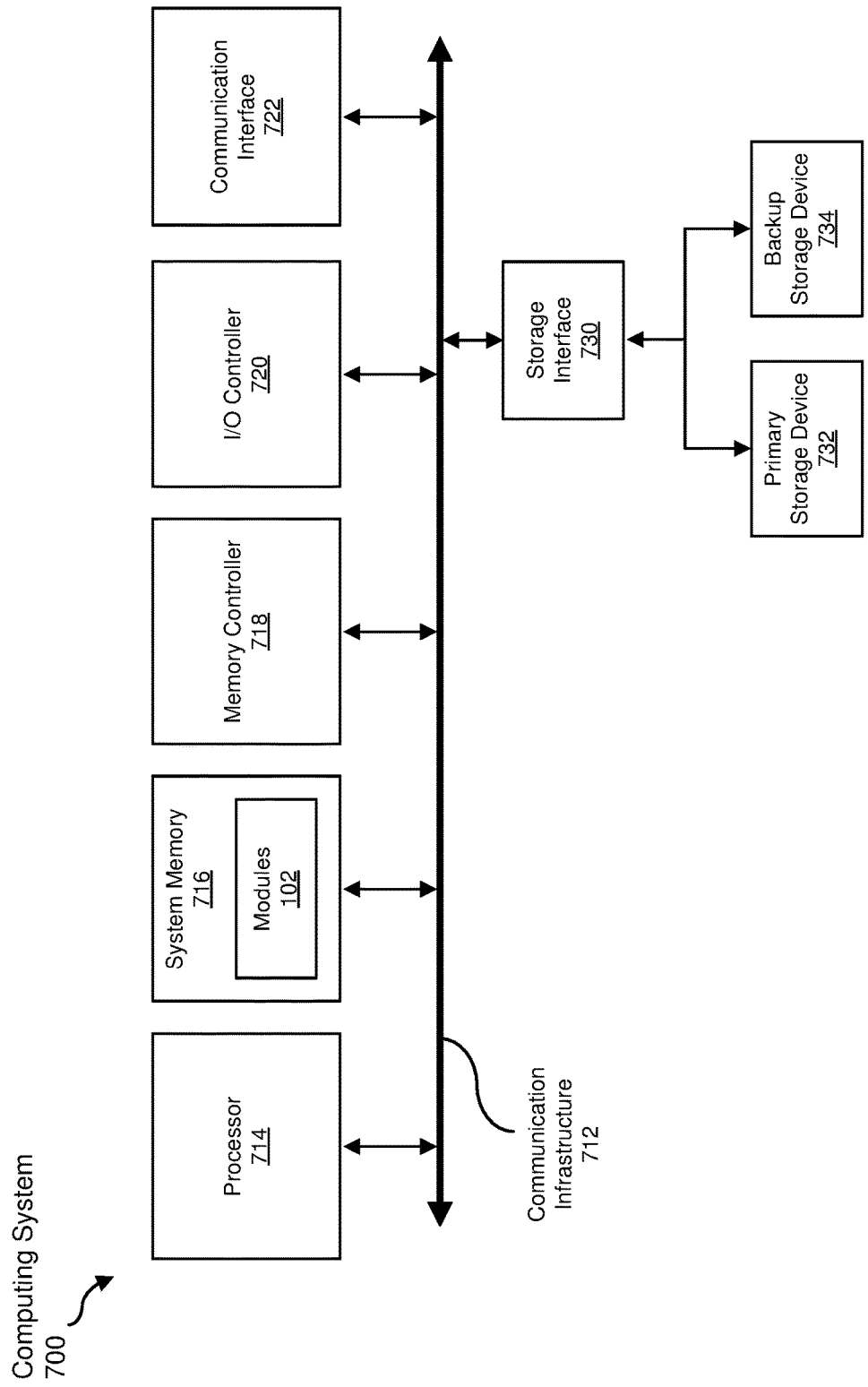
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 3. All or a portion of computing system 700 may also perform and/or be a means for performing and/or implementing any other steps, methods, or processes described and/or illustrated herein. In one example, computing system 700 may include and/or store all or a portion of modules 102 from FIG. 1.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   creating, at a network device, a relationship management information base that facilitates querying relationships of objects stored across a plurality of other management information bases on the network device;
   loading, into the relationship management information base, a first partition that defines relationships among a plurality of objects stored across the other management information bases on the network device, wherein the plurality of objects whose relationships are defined by the first partition comprise:
      a virtual bridge;
      a main interface of the virtual bridge;
      at least one sub-interface of the virtual bridge; and
      statistics for the main interface and the sub-interface of the virtual bridge;
   loading, into the relationship management information base, a second partition that defines relationships among the plurality of objects stored across the other management information bases on the network device;
   assigning partition names to the first partition and the second partition;
   populating a table that includes one or more trees of object identifiers for the objects;
   appending, within the table, regular expressions to endings of the object identifiers included in the table;
   indexing the table by the partition names assigned to the first and second partitions and the trees of object identifiers;
   receiving, at the network device, a single query directed to the relationship management information base from a network management system, wherein the single query identifies the first partition by the partition name assigned to the first partition and does not include object identifiers for all the objects whose relationships are defined by the first partition that is loaded into the relationship management information base;
   providing, at the network device, a Simple Network Management Protocol (SNMP) agent;
   in response to the single query directed to the relationship management information base:
      identifying the first partition based on the partition name included in the single query;
      identifying, within the table, a subset of the regular expressions that correspond to the first partition;
      obtaining, by the SNMP agent from the other management information bases, instances of the objects whose relationships are defined by the first partition that is loaded into the relationship management information base and identified by the partition name included in the single query, wherein the SNMP agent obtains the instances of the objects by querying a sub-agent that manages the other management information bases for the instances of the objects based at least in part on the subset of regular expressions that correspond to the first partition; and
   providing the objects obtained from the other management information bases to the network management system to satisfy the single query.

2. The method of claim 1, wherein the objects further comprise at least one of:
   an object identifier; and
   a value that corresponds to the object identifier.

3. The method of claim 1, wherein providing the objects to the network management system comprises:
   configuring the objects as opaque data types such that:
      the objects are encoded during transfer to the network management system; and
      the network management system is able to decode the objects from the opaque data types; and
   transferring the objects as opaque data types to the network management system.

4. The method of claim 1, further comprising enabling at least one user to query any objects:
   whose relationship is defined by the first partition or the second partition; and
   that are represented in an SNMP view provided to the user.

5. A system comprising:
   a creation module, stored in memory at a network device, that creates a relationship management information base that facilitates querying relationships of objects stored across a plurality of other management information bases on the network device;
   a partition module, stored in memory at the network device, that:
      loads, into the relationship management information base, a first partition that defines relationships among a plurality of objects stored across the other management information bases on the network device, wherein the plurality of objects whose relationships are defined by the first partition comprise:
         a virtual bridge;
         a main interface of the virtual bridge;
         at least one sub-interface of the virtual bridge; and
         statistics for the main interface and the sub-interface of the virtual bridge;
      loads, into the relationship management information base, a second partition that defines relationships among the plurality of objects stored across the other management information bases on the network device;
      assigns partition names to the first partition and the second partition;
      populates, a table that includes one or more trees of object identifiers for the objects;
      appends, within the table, regular expressions to endings of the object identifiers included in the table;

indexes the table by the partition names assigned to the first and second partitions and the trees of object identifiers;

a receiving module, stored in memory at the network device, that receives a single query directed to the relationship management information base from a network management system, wherein the single query identifies the first partition by the partition name assigned to the first partition and does not include object identifiers for all the objects whose relationships are defined by the first partition that is loaded into the relationship management information base;

an SNMP agent, stored in memory at the network device, that:
- identifies the first partition based on the partition name included in the single query;
- identifies, within the table, a subset of the regular expressions that correspond to the first partition;
- obtains, from the other management information bases in response to the single query, instances of the objects whose relationships are defined by the first partition that is loaded into the relationship management information base and identified by the partition name included in the single query, wherein the SNMP agent obtains the instances of the objects by querying a sub-agent that manages the other management information bases for the instances of the objects based at least in part on the subset of regular expressions that correspond to the first partition;

a providing module, stored in memory at the network device, that provides the objects obtained from the other management information bases to the network management system to satisfy the single query; and at least one physical processor configured to execute the creation module, the partition module, the receiving module, the SNMP agent, and the providing module.

6. The system of claim 5, wherein the objects further comprise at least one of:
- an object identifier; and
- a value that corresponds to the object identifier.

7. The system of claim 5, wherein the partition module:
configures the objects as opaque data types such that:
- the objects are encoded during transfer to the network management system; and
- the network management system is able to decode the objects from the opaque data types; and
transfers the objects as opaque data types to the network management system.

8. The system of claim 5, wherein the partition module enables at least one user to query any objects:
- whose relationship is defined by the first partition or the second partition; and
- that are represented in an SNMP view provided to the user.

9. An apparatus comprising:
at least one storage device that stores a relationship management information base that facilitates querying relationships of objects stored across a plurality of other management information bases on a network device; and at least one physical processing device that is communicatively coupled to the storage device at the network device, wherein the physical processing device:
- loads, into the relationship management information base, a first partition that defines relationships among a plurality of objects stored across the other management information bases on the network device, wherein the plurality of objects whose relationships are defined by the first partition comprise:
  - a virtual bridge;
  - a main interface of the virtual bridge;
  - at least one sub-interface of the virtual bridge; and
  - statistics for the main interface and the sub-interface of the virtual bridge;
- loads, into the relationship management information base, a second partition that defines relationships among the plurality of objects stored across the other management information bases on the network device;
- assigns partition names to the first partition and the second partition;
- populates a table that includes one or more trees of object identifiers for the objects;
- appends, within the table, regular expressions to endings of the object identifiers included in the table;
- indexes the table by the partition names assigned to the first and second partitions and the trees of object identifiers;
- receives a single query directed to the relationship management information base from a network management system, wherein the single query identifies the first partition by the partition name assigned to the first partition and does not include object identifiers for all the objects whose relationships are defined by the first partition that is loaded into the relationship management information base;
- provide, at the network device, a Simple Network Management Protocol (SNMP) agent;
- in response to the single query directed to the relationship management information base:
  - identifies the first partition based on the partition name included in the single query;
  - identifies, within the table, a subset of the regular expressions that correspond to the first partition;
  - obtains, by the SNMP agent from the other management information bases, instances of the objects whose relationships are defined by the first partition that is loaded into the relationship management information base and identified by the partition name included in the single query, wherein the SNMP agent obtains the instances of the objects by querying a sub-agent that manages the other management information bases for the instances of the objects based at least in part on the subset of regular expressions that correspond to the first partition; and
- provides the objects obtained from the other management information bases to the network management system to satisfy the single query.

* * * * *